United States Patent
Schroeyers et al.

(10) Patent No.: US 10,442,962 B2
(45) Date of Patent: Oct. 15, 2019

(54) HIGH POLYMER LOAD POLYOLEFIN ADHESIVE COMPOSITIONS

(71) Applicant: ExxonMobil Chemical Patents Inc.

(72) Inventors: Jurgen J. M. Schroeyers, Helchteren (BE); Jennifer J. Austin, The Woodlands, TX (US); Shawn W. Mowry, Houstin, TX (US); James N. Coffey, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/902,144

(22) PCT Filed: Oct. 6, 2014

(86) PCT No.: PCT/US2014/059250
§ 371 (c)(1),
(2) Date: Dec. 30, 2015

(87) PCT Pub. No.: WO2015/057416
PCT Pub. Date: Apr. 23, 2015

(65) Prior Publication Data
US 2016/0319166 A1 Nov. 3, 2016

Related U.S. Application Data

(60) Provisional application No. 61/892,826, filed on Oct. 18, 2013.

(51) Int. Cl.
*C09J 123/14* (2006.01)
*C08K 5/00* (2006.01)
*C08L 23/14* (2006.01)

(52) U.S. Cl.
CPC ........... *C09J 123/142* (2013.01); *C08K 5/005* (2013.01); *C08K 5/0016* (2013.01); *C08L 23/142* (2013.01); *C08L 2205/025* (2013.01); *C08L 2314/06* (2013.01)

(58) Field of Classification Search
CPC ........... C09J 123/142; C08L 2205/025; C08L 2314/06
USPC ....................................................... 524/570
See application file for complete search history.

(56) References Cited

U.S. PATENT DOCUMENTS

| 6,657,009 B2 | 12/2003 | Zhou |
| 6,774,069 B2 | 8/2004 | Zhou et al. |
| 6,887,941 B2 | 5/2005 | Zhou |
| 6,992,131 B2 | 1/2006 | Faissat et al. |
| 7,232,871 B2 | 6/2007 | Datta et al. |
| 7,294,681 B2 | 11/2007 | Jiang et al. |
| 7,524,910 B2 | 4/2009 | Jiang et al. |
| 7,601,666 B2 | 10/2009 | Rix et al. |
| 7,786,032 B2 | 8/2010 | Zhou et al. |
| 8,038,661 B2 | 10/2011 | Sue et al. |
| 8,430,856 B2 | 4/2013 | Sue et al. |
| 8,487,026 B2 | 7/2013 | Bach et al. |
| 9,359,535 B2* | 6/2016 | Coffey ...................... C08F 6/04 |
| 2008/0009036 A1 | 1/2008 | Lunnen et al. |
| 2009/0075540 A1 | 3/2009 | Zhou et al. |
| 2009/0306281 A1* | 12/2009 | Tancrede ............... C09J 123/10 524/583 |
| 2011/0054117 A1* | 3/2011 | Hall ..................... C09J 123/142 524/579 |
| 2012/0328805 A1 | 12/2012 | Davis |
| 2012/0329350 A1 | 12/2012 | Davis et al. |
| 2012/0329353 A1 | 12/2012 | Davis et al. |
| 2012/0329929 A1 | 12/2012 | Miller et al. |
| 2013/0005884 A1 | 1/2013 | Davis et al. |
| 2015/0112014 A1* | 4/2015 | Tripathy ............... C09J 123/16 524/528 |
| 2015/0247069 A1* | 9/2015 | Schauder ............... C09J 123/10 524/528 |

FOREIGN PATENT DOCUMENTS

| WO | 2012/051239 | 4/2012 |
| WO | 2012/129489 | 9/2012 |
| WO | 2013/134038 | 9/2013 |

OTHER PUBLICATIONS

Cheng, "$^{13}$C NMR Analysis of Ethylene-Propylene-Rubbers", Macromolecules, vol. 17, No. 10, 1984, pp. 1950-1955.
Sun et al., "Effect of Short Chain Branching on the Coil Dimensions of Polyolefins in Dilute Solution", Macromolecules, vol. 34, No. 19, 2001, pp. 6812-6820.

\* cited by examiner

Primary Examiner — Kelechi C Egwim

(57) ABSTRACT

The present invention is related to adhesive compositions comprising about 50 to about 80 wt % of a polymer blend of at least two different propylene-based polymers, wherein the polymer blend has a melt viscosity of about 100 to about 6,000 cP and adhesive compositions comprising about 30 to about 60 wt % of a polymer blend of at least two different propylene-based polymers, wherein the polymer blend has a melt viscosity of about 6,000 cP to about 60,000 cP. When subjected to Temperature Rising Elution Fractionation, the polymer blend exhibits a first fraction that is soluble at −15° C. in xylene, the first fraction having an isotactic (mm) triad tacticity of about 70 mol % to about 90 mol %; and a second fraction that is insoluble or less soluble than the first fraction at −15° C. in xylene, the second fraction having an isotactic (mm) triad tacticity of about 85 mol % to about 98 mol %.

10 Claims, 3 Drawing Sheets

HIGH POLYMER LOAD POLYOLEFIN ADHESIVE COMPOSITIONS

PRIORITY CLAIM TO RELATED APPLICATIONS

This application is a National Stage Application of International Application No. PCT/US2014/059250, filed Oct. 6, 2014, which claims the benefit of 61/892,826, filed Oct. 18, 2013, the disclosures of which are fully incorporated herein by reference in their entirety.

FIELD OF INVENTION

The invention relates to a polyolefin adhesive composition comprising a high polymer load.

BACKGROUND

Adhesive composition components such as base polymers, tackifiers, waxes, and oils are customarily provided as separate components for formulation into hot melt adhesive (HMA) compositions. HMA compositions for nonwoven applications are used for construction and lamination, e.g., to attach nonwoven and other components together and to adhere the layers of a material together. Nonwoven applications can include hygiene products such as baby diapers, adult diapers, incontinence products or devices, absorbent articles, panty liners, and sanitary napkins. In nonwoven applications, HMA compositions are sought that provide a desired combination of physical properties such as stable adhesion over time indicative of broad application temperature ranges, and machine coatability. Machine coatability is a term well known in the art to refer to the robust application ability of an adhesive formulation on a substrate, via a machine, requiring only minimal adjustment of machine settings including machine speed and temperature. An adhesive formulation having good machine coatability can reduce time and therefore costs associated with the adhesive application process, because the adhesive formulation is versatile enough to be used on more than one machine without many adjustments of the machine settlings. Poor machine coatability can result in web breaks of the adhesive formulation during application of the adhesive at starting and stopping intervals of the machine, which can unfavorably impact line efficiency, and also result in increased down time and high costs. HMAs having stable and consistent adhesion over broad application temperatures are also generally sought for nonwoven construction and lamination applications.

Exemplary base polymer compositions and methods of making polymer compositions for HMA applications are disclosed in U.S. Pat. Nos. 7,294,681 and 7,524,910. Various polymers described in these patents and/or produced by the methods disclosed in these patents have been sold by ExxonMobil Chemical Company as LINXAR™ polymers.

WO Publication No. 2013/134038 discloses a method for producing a polymer blend having at least two different propylene-based polymers produced in parallel reactors. The multi-modal polymer blend has a Mw of about 10,000 g/mol to about 150,000 g/mol. When subjected to Temperature Rising Elution Fractionation, the polymer blend exhibits a first fraction that is soluble at −15° C. in xylene, the first fraction having an isotactic (mm) triad tacticity of about 70 mol % to about 90 mol %; and a second fraction that is insoluble or less soluble than the first fraction at −15° C. in xylene, the second fraction having an isotactic (mm) triad tacticity of about 85 mol % to about 98 mol %.

Although many different types of polymers are known and have been used in HMA formulations, there remains a need for a tackified adhesive formulation that has high loading of the new based polymers to achieve equivalent or better adhesive performance attributes including stable adhesion over time indicative of broad application temperature ranges, and machine coatability, as compared to HMA formulations that are currently available.

Accordingly, the present invention is directed to an adhesive composition utilizing the new polymer blends, such that the adhesive composition has stable adhesion over time, indicative of broad application temperature ranges, and machine coatability. The adhesive compositions described herein can be applied by contact and contactless, e.g. spray, application techniques. The adhesive compositions described can be used in nonwoven construction/lamination and nonwoven elastic applications alike.

SUMMARY

The foregoing and/or other challenges are addressed by the methods and products disclosed herein.

In one aspect, a polymer blend and one or more tackifiers is provided for use in an adhesive composition. The polymer blend includes a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer. The polymer blend has a melt viscosity, measured at 190° C. of less than about 6,000 cP. When subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %. The polymer blend is present in the amount of about 50 to about 100 wt % of the adhesive composition.

In another aspect, a polymer blend and one or more tackifiers is provided for use in an adhesive composition. The polymer blend includes a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer. The polymer blend has a melt viscosity, measured at 190° C. of greater than or equal to about 6,000 cP. When subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %. The polymer blend is present in the amount of about 30 to about 60 wt % of the adhesive composition.

These and other aspects of the present inventions are described in greater detail in the following detailed description and are illustrated in the accompanying figures and tables.

DETAILED DESCRIPTION

Figure 1:
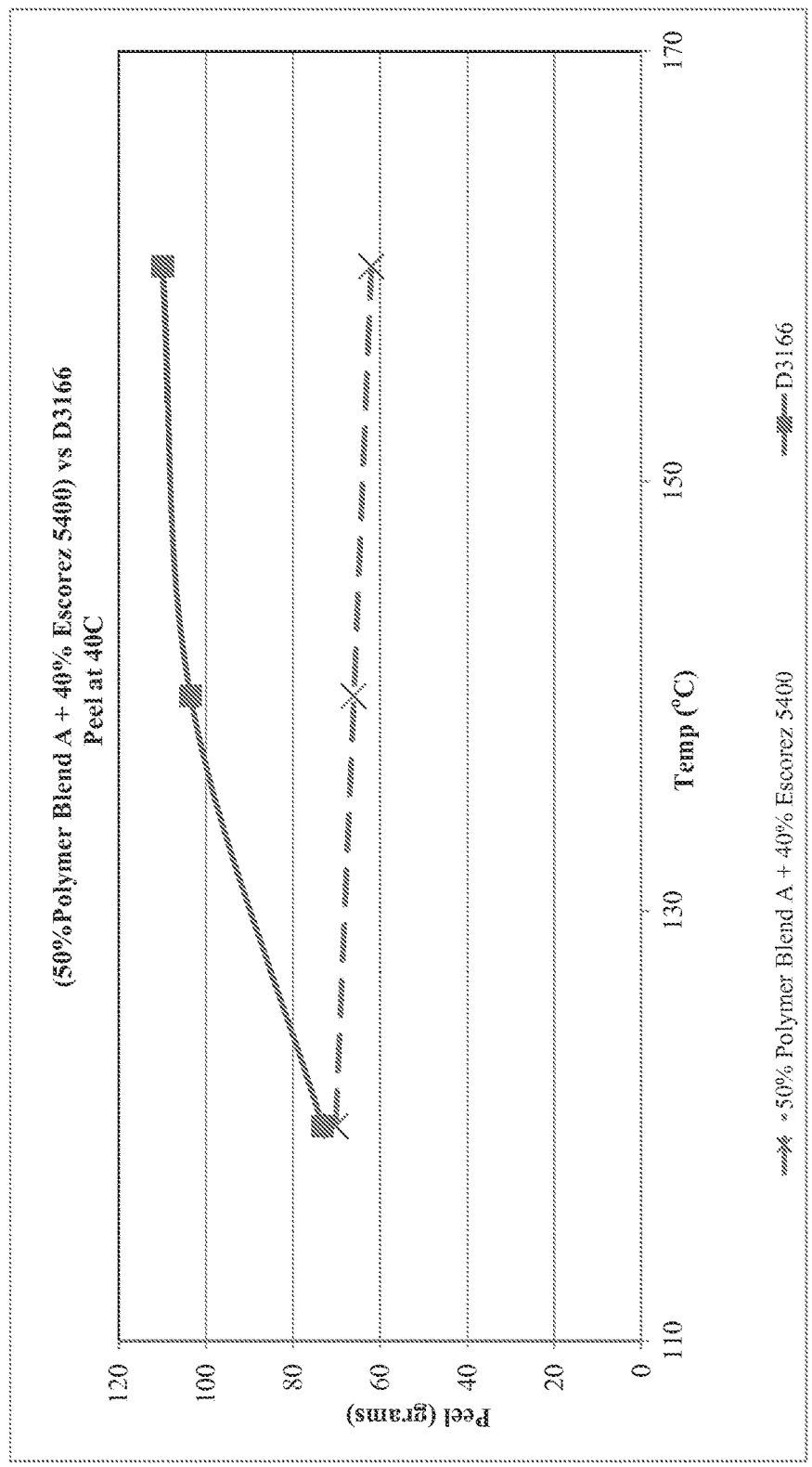
FIG. 1 depicts the peel strength of hot melt adhesive formulations over different application temperatures.

It has been discovered that high loading polymer blends to form adhesive compositions results in advantageous properties for the adhesive compositions including stable adhesion over time, which is indicative of broad application temperature ranges, and machine coatability, equivalent to or better than commercially available adhesives4. The inventive adhesives may be produced using a new process platform that is more robust and lacks many of the limitations and difficulties associated with the processes employed to make LINXAR™ polymers and those disclosed in U.S. Pat. Nos. 7,294,681 and 7,524,910.

Advantageously, about 50 to about 100 wt % of one or more polymer blends is used in adhesive formulations when the polymer blend has a melt viscosity of less than about 6,000 cP, for example, about 100 to about 6,000 cP. About 30 to about 60 wt % of one or more polymer blends is used in adhesive formulations when the polymer blend has a melt viscosity of greater than or equal to about 6.000 cP, for example about 6,000 to about 60,000 cP.

Advantageously, polymers used in the adhesive composition can be produced using the new process platform that share many of the characteristics of the LINXAR™ polymers that make the LINXAR™ polymers excellent polymers for use in adhesive applications. New polymers can be produced using the new process platform that possess other characteristics that, although differentiate the polymers from the LINXAR™ polymers, are believed to contribute to the new polymers' excellent adhesive performance. These polymers may also, when subjected to Temperature Rising Elution Fractionation, exhibit a first fraction that is soluble at −15° C. in xylene, and a second fraction that is insoluble or less soluble than the first fraction at −15° C. in xylene. The first fraction may have an isotactic (mm) triad tacticity of about 70 mol % to about 90 mol %, and the second fraction may have an isotactic (mm) triad tacticity of about 85 mol % to about 98 mol %. In preferred embodiments, portions of each polymer of the polymer blend are represented in each fraction.

A. Methods of Preparing Polyolefin Adhesive Components and Compositions

A solution polymerization process for preparing a polyolefin adhesive component is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final polymer blend. For adhesive compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second reactor may receive a third monomer feed of a third monomer, a fourth monomer feed of a fourth monomer, and a catalyst feed of a second catalyst. The second reactor may also receive feeds of a solvent and activator. The solvent and/or the activator feed may be combined with any of the third monomer feed, the fourth monomer feed, or second catalyst feed, or the solvent and activator may be supplied to the reactor in separate feed streams. A second polymer is produced in the second reactor and is evacuated from the second reactor via a second product stream. The second product stream comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, and octene. In any embodiment, the relative amounts of propylene and comonomer supplied to the second reactor may be designed to produce a polymer that is predominantly propylene, i.e., a polymer that is more than 50 mol % propylene. In another embodiment, the second reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous blends are described in greater detail herein.

It should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor and second reactor or the third reactor may be in series with one of the first reactor and second reactor.

Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

WO Publication No. 2013/134038 generally describes the method of preparing polyolefin adhesive components and compositions. The contents of WO Publication No. 2013/134038 and its parent application U.S. Patent Application Ser. No. 61/609,020 filed Mar. 9, 2012, are both incorporated herein in their entirety.

B. Polymers

Preferred polymers are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "polymer blend" as used herein includes, but is not limited to a blend of one or more polymers prepared in solution or by physical blending, such as melt blending.

"Propylene-based" or "predominantly propylene-based" as used herein, is meant to include any polymer comprising propylene, either alone or in combination with one or more comonomers, in which propylene is the major component (i.e., greater than 50 mol % propylene).

In any embodiment, one or more polymers of the blend may comprise one or more propylene-based polymers, which comprise propylene and from about 2 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 120° C., or less than about 115° C., or less than about 110° C., or less than about 100° C., or less than about 90° C. In any embodiment, the Tm of the one or more polymers of the blend may be greater than about 25° C., or greater than about 30° C., or greater than about 35° C., or greater than about 40° C.

In one or more embodiments, the first crystallization temperature (Tc1) of the polymer blend (as determined by DSC) is less than about 110° C., or less than about 90° C., or less than about 80° C., or less than about 70° C., or less than about 60° C., or less than about 50° C., or less than about 40° C., or less than about 30° C. or less than about 20° C., or less than about 10° C. In the same or other embodiments, the Tc1 of the polymer is greater than about 0° C., or greater than about 5° C., or greater than about 10° C., or greater than about 15° C., or greater than about 20° C. In any embodiment, the Tc1 lower limit of the polymer may be 0° C., 5° C., 10° C. 20° C., 30° C., 40° C., 50° C., 60° C., and 70° C.; and the Tc1 upper limit temperature may be 100° C., 90° C., 80° C., 70° C., 60° C., 50° C., 40° C., 30° C. 25° C., and 20° C. with ranges from any lower limit to any upper limit being contemplated.

In one or more embodiments, the second crystallization temperature (Tc2) of the polymer (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc2 of the polymer is greater than about 0° C., or greater than about 5° C., or greater than about 10° C., or greater than about 15° C., or greater than about 20° C. In any embodiment, the Tc2 lower limit of the polymer may be 0° C., 5° C., 10° C., 20° C., 30° C. 40° C., 50° C., 60° C., and 70° C.; and the Tc2 upper limit temperature may be 120° C., 110° C., 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 500/%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a level of isotacticity expressed as percentage of isotactic triads (three consecutive propylene units), as measured by $^{13}C$ NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Patent Application Publication No. 2004/0236042.

The semi-crystalline polymer may have a tacticity index m/r ranging from a lower limit of 4, or 6 to an upper limit of 10, or 20, or 25. The tacticity index, expressed herein as "m/r", is determined by $^{13}C$ nuclear magnetic resonance ("NMR"). The tacticity index m/r is calculated as defined by H. N. Cheng in 17 MACROMOLECULES, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm³ to about 0.92 g/cm³, or from about 0.86 g/cm³ to about 0.90 g/cm³, or from about 0.86 g/cm³ to about 0.89 g/cm³ at room temperature and determined according to ASTM D-792. As used herein, the term "room temperature" is used to refer to the temperature range of about 20° C. to about 23.5° C.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200.000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, P(θ) is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight. $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i M = \Sigma N_i M_i / \Sigma N_i$$

since the mole fraction $x_1$ is defined as $N_i$ divided by the total number of molecules $$x_i = N_i / \Sigma N_i$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v = (\Sigma c_i M_i^\alpha / \Sigma c_i)^{1/\alpha}$$

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

The polymers that may be used in the adhesive compositions disclosed herein generally include any of the polymers according to the process disclosed in WO Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences. Such polymers made in accordance with WO Publication No. 2013/134038, when subjected to Temperature Rising Elution Fractionation, exhibit: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %. The contents of WO Publication No. 2013/134038 and its parent application U.S. Patent Application Ser. No. 61/609,020 filed Mar. 9, 2012, are both incorporated herein in their entirety.

Polymers and blended polymer products are also provided. In any embodiment, one or more of the polymers described herein may be blended with another polymer, such as another polymer described herein, to produce a physical blend of polymers.

Catalysts/Activators

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2.4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylphenyl) indenyl) zirconium dimethyl, (dimethylsilyl)bis(2-methyl-4-(3,'5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz (f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a —$(CH_2)_a$— group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

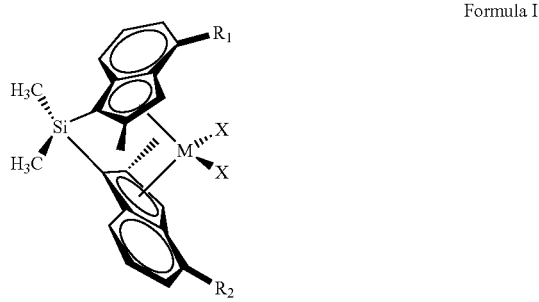

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)^4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl) borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x$—Al—O$)_n$, which is a cyclic compound, or $R^x(R^X$—Al—O$)_nAlR^x{}_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment. $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide (OR$^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

WO Publication No. 2013/134038 generally describes the catalysts, activators, and solvents used to prepare the polymer blend used in the adhesive compositions. The contents of WO Publication No. 2013/134038 and its parent application U.S. Patent Application Ser. No. 61/609,020 filed Mar. 9, 2012, are both incorporated herein in their entirety.

C. Tackifier

The term "tackifier" is used herein to refer to an agent that allows the polymer of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the HMA solidifying.

"Softening Point" is the temperature, measured in ° C., at which a material will flow, as determined by ASTM E-28.

"Aromaticity" is determined by NMR spectroscopy and is measured in mol % of aromatic protons.

Although the exemplary formulations disclosed herein focus on formulations in which one or more tackifiers are blended with one or more polymer blends, adhesive formulations having no tackifier or substantially no tackifier are also contemplated. In embodiments, other tackifiers may be used with the polymer blends of the invention including, but not limited to, alkylphenolic, coumarone indene, other hydrogenated or non-hydrogenated hydrocarbon resins, hydroxylated polyester resin, phenolic, pure monomer styrene, resin dispersion, rosin ester, rosin, and terpene tackifiers.

D. Additives: Plasticizer, Wax, Antioxidant

The HMA composition can include other additives, e.g., plasticizers, waxes, antioxidants, and combinations thereof either alone or in combination with one or more tackifiers disclosed herein. The HMA composition can also include one or more polymer additives, either alone or in combination with one or more tackifiers, plasticizers, waxes, or antioxidants, and combinations thereof as disclosed herein.

The term "polymer additive" is used herein to refer to a substance having a lower melt viscosity, measured at 190° C. and a higher crystallinity, as compared to the melt viscosity and crystallinity of the polymer blend used in the adhesive formulation. The polymer additive is added to improve the performance attributes, including decreasing the melt viscosity, of the adhesive formulation to fit the end use of the formulation in a construction/laminate nonwoven or an elastic nonwoven. The addition of a polymer additive is not restricted to formulations used in a construction/laminate nonwoven or an elastic nonwoven.

In embodiments, polymer additives may be used with the polymer blends of the invention including, but not limited to Polymer Additive A, a bi-modal polymer having a Melt Viscosity at 190° C. of about 903 cP, DSC Crystallinity of about 41 J/g, a Shore Hardness C of about 35, Ethylene Content of about 8.2%, DSC Melting Point of about 111.35° C.

In embodiments, polymer additives may be used with the polymer blends of the invention including, but not limited to Vistamaxx™ 6202 available from ExxonMobil Chemical. Vistamaxx™ 6202 propylene-based elastomer is an olefin elastomer having a Density of 0.863 g/cm3, Melt Index (at 190° C./2.16 kg) of 9.1 g/10 min, Melt Mass-Flow Rate of 20 g/10 min, Ethylene Content of 15 wt %, Shore Hardness A of 66. In embodiments, polymer additives may be used with the polymer blends of the invention including, but not limited to Kraton™ G SEBS (styrene-ethylene/butylene-styrene) grade polymers available from Kraton Polymers located in Houston, Tex.

The term "plasticizer" is used herein to refer to a substance that improves the fluidity of a material. Useful commercial available plasticizers include Primol™ 352, Krystol™ 550, and Nyflex™ 222B. Primol™ 352 is a white oil available from ExxonMobil Chemical. Krystol™ 550 is a white oil available from Petro-Canada Lubricants. Nyflex™ 222B is a solvent refined naphthenic oil available from Nynas AB, located in Stockholm, Sweden.

The term "antioxidant" is used herein to refer to high molecular weight hindered phenols and multifunctional phenols. A useful commercially available antioxidant is Irganox™ 1010. Irganox 1010 is a hindered phenolic antioxidant available from BASF SE Corporation located in Ludwigshafen, Germany. The invention is not limited to Irganox 1010 as the antioxidant. In embodiments, other antioxidants that may be used with the polymer blends of the invention, including, but are not limited to amines, hydroquinones, phenolics, phosphites, and thioester antioxidants.

The term "wax" is used herein to refer to a substance that tweaks the overall viscosity of the adhesive composition. The primary function of wax is to control the set time and cohesion of the adhesive system. Adhesive compositions of the present invention may comprise paraffin (petroleum) waxes and microcrystalline waxes. In embodiments, the adhesive compositions of the present invention may comprise no wax. In embodiments, waxes may be used with the polymer blends of the invention, but not limited to, Castor Oil derivatives (HCO-waxes), ethylene co-terpolymers, Fisher-Tropsch waxes, microcrystalline, paraffin, polyolefin modified, and polyolefin.

E. Applications of Polyolefin Adhesive Compositions

The adhesive formulations disclosed herein can be used in various nonwoven construction applications including, but not limited to, hygiene products such as baby diapers, adult diapers, incontinence products or devices, absorbent articles, panty liners, and sanitary napkins. The adhesive formulations disclosed herein can also be used in various nonwoven elastic applications including, but not limited to, hygiene products such as wound care dressings for human or veterinary medicine. As the hygiene industry is continuing to move to products, articles, and devices with thinner gauge films and thinner nonwoven materials, the industry is continuing to seek adhesive formulations that can be applied over a broad application temperature range, for versatility of an adhesive formulation in more than one end use product, article, device, and combinations thereof. The adhesive formulations described herein, having a high polymer load, provide a desired combination of physical properties such as stable adhesion over time indicative of broad application temperature ranges and machine coatability and therefore can be used in nonwoven applications including hygiene products disclosed herein. It should be appreciated that the adhesive formulations of the present disclosure, while being well suited for use in hygiene nonwoven products, may also find utility in other applications as well.

In embodiments, one or more adhesive formulations can be used in baby or adult diapers, incontinence product, or training pants. One or more adhesive formulations disclosed herein may be used alone or in combination with other additives for affixing and or securing different layers or different components of a disposable diaper, incontinence product, or training pant construction. The construction of a diaper, incontinence product, or training pant can be accomplished in any conventional manner known in the art.

In a common construction, a diaper, incontinence product, or training pant includes a pant body having a front section, a back section, a crotch section, two elastic sections each having a front elastic member and a back elastic member, two leg openings and a waist opening, a backsheet and a topsheet, a waistband and two leg bands, a waistborder and two leg borders, an absorbent article, and optionally a fastening device having a quick-remove peelable layer on the fastening device when the diaper, incontinence product, or training pant is not in use. Certain non-limiting examples of using one or more adhesive formulations of the present disclosure in a diaper, incontinence product, or training pant include attaching the sides of the front section to the back section, attaching the crotch section to the front section and the back section, attaching the topsheet to the front layer, attaching the backsheet to the back layer, attaching the absorbent article to the crotch section, attaching each of the leg bands to each of the leg openings of the topsheet and backsheet, attaching each of the leg borders to each of the leg bands, attaching the waistband to the top section of the top sheet and the top section of the backsheet, attaching the waistborder to the waistband, attaching the quick-remove peelable layer to the fastening device, and attaching the fastening device to the waistborder.

In embodiments, one or more adhesive formulations can be used in sanitary napkins or panty liners. As used herein, the term "sanitary napkin" refers to an externally positioned, disposable absorbent article in the form of a catamenial device, configured for the absorption of body fluids such as menses. As used herein, the term "panty liner" refers to an externally positioned, disposable absorbent article having a thinner gauge and a narrower width than a sanitary napkin that can be configured for the absorption of body fluids. The construction of a sanitary napkin or panty liner can be accomplished in any conventional manner known in the art.

In a common construction, a sanitary napkin or panty liner includes a front body having an absorbent article, back body to be positioned on the undergarment of the wearer, a quick-remove peelable protectable layer covering the back body when the sanitary napkin or panty liner is not in use, optionally two side wing projections on either side of the front body and a quick-remove peelable protective layer covering each of the two side wing projections when the sanitary napkin or panty liner is not in use. Certain non-limiting examples of using one or more adhesive formulations of the present disclosure in a sanitary napkin or panty liner include attaching an absorbent article to the front body, attaching the front body to the back body, attaching a quick-remove peelable protective layer to the back body, attaching the two side wing projections on the front body, and attaching a quick-remove peelable protective layer to each of the two side wing projections on the front body.

In embodiments, one or more adhesive formulations can be used in a wound care dressing for human or veterinary medicine. As used herein, the term "wound care dressing" refers to wet, dry, or a combination of wet and dry, gauze used at or around a wound site to help wound healing. The construction of a wound care dressing can be accomplished in any conventional manner known in the art. In a common construction, a wound care dressing includes a top layer that is visible to the patient and a bottom layer that is in contact with the wound, an absorbent article, an adhesive coating the bottom layer, and a quick-remove peelable protective layer covering the bottom layer when the wound care dressing is not in use. Certain non-limiting examples of using one or more adhesive formulations of the present disclosure in a wound care dressing include attaching an absorbent article to the bottom layer, attaching the bottom layer to the top layer, attaching the quick-remove peelable protective layer to the bottom layer, and attaching the adhesive coating to the bottom layer.

Specific Embodiments

The invention may also be understood with relation to the following specific embodiments:

Paragraph A: an adhesive composition comprising: (a) a polymer blend comprising a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. of about 100 to about 6,000 cP and wherein, when subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %; wherein the polymer blend is present in the amount of about 50 to about 80 wt %/o of the adhesive composition; and (b) a tackifier; wherein the adhesive composition has a melt viscosity, measured at 140° C. of about 50 to about 5,500 cP.

Paragraph B: The adhesive composition of Paragraph A, wherein the tackifier has a softening point, as determined by ASTM E-28, of about 80 to about 145° C.

Paragraph C: The adhesive composition of Paragraph A, wherein the tackifier has an aromaticity of about 0 to about 15 mol % aromatic protons.

Paragraph D: The adhesive composition of Paragraph A, wherein the tackifier may be a single tackifier or a blend of one or more tackifiers.

Paragraph E: The adhesive composition of Paragraph A, further comprising an antioxidant and a plasticizer.

Paragraph F: The adhesive composition of Paragraph A, further comprising a wax present in the amount of less than about 10 wt % of the adhesive composition.

Paragraph G: The adhesive composition of Paragraph A, further comprising one or more polymer additives having a lower total melt viscosity, measured at 190° C., and higher total crystallinity, as compared to the melt viscosity and crystallinity of the polymer blend.

Paragraph H: The adhesive composition of Paragraph A, wherein the adhesive composition has a peel strength, as determined by ASTM D-903, that does not vary by more than about 10% over an application temperature of about 110° C. to 190° C.

Paragraph I: The adhesive composition of Paragraph A, wherein the polymer blend has a heat of fusion of between about 5 to about 40 J/g, preferably about 10 to about 30 J/g.

Paragraph J: The adhesive composition of Paragraph A, wherein the melt viscosity of the adhesive composition, measured at 180° C., does not vary by more than about 10% for up to about 48 hours.

Paragraph K: An article comprising the adhesive composition of Paragraph A.

Paragraph L: An article of Paragraph K wherein the adhesive composition adheres one or more substrates, and wherein at least one of the one or more substrates comprises paper, cardboard, plastic, nonwoven, metal, wood, other natural fiber based material, or combinations thereof.

Paragraph M: An adhesive composition comprising: (a) a polymer blend comprising a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. of about 6,000 to about 60,000 cP; and wherein, when subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %; wherein the polymer blend is present in the amount of about 30 to about 60 wt % of the adhesive; and (b) a tackifier; wherein the adhesive composition has a melt viscosity, measured at 140° C. of about 1,500 to about 15,000 cP.

Paragraph N: The adhesive composition of Paragraph M, wherein the tackifier has a softening point, as determined by ASTM E-28, of about 80 to about 145° C.

Paragraph O: The adhesive composition of Paragraph M, wherein the tackifier has an aromaticity of about 0 to about 15 mol % aromatic protons.

Paragraph P: The adhesive composition of Paragraph M, wherein the tackifier may be a single tackifier or a blend of one or more tackifiers.

Paragraph Q: The adhesive composition of Paragraph M, further comprising an antioxidant and a plasticizer.

Paragraph R: The adhesive composition of Paragraph M, further comprising a wax present in the amount of less than about 10 wt % of the adhesive composition.

Paragraph S: The adhesive composition of Paragraph M, further comprising one or more polymer additives having a lower total melt viscosity, measured at 190° C. and higher total crystallinity, as compared to the melt viscosity and crystallinity of the polymer blend.

Paragraph T: The adhesive composition of Paragraph M, wherein the adhesive composition has a peel strength, as determined by ASTM D-903, that does not vary by more than about 10% over an application temperature of about 110° C. to about 190° C.

Paragraph U: The adhesive composition of Paragraph M, wherein the polymer blend has a heat of fusion of between about 5 to about 40 J/g, preferably about 10 to about 30 J/g.

Paragraph V: The adhesive composition of Paragraph M, wherein the melt viscosity of the adhesive composition, measured at 180° C., does not vary by more than about 10% for up to about 48 hours.

Paragraph W: An article comprising the adhesive composition of Paragraph M.

Paragraph X: An article of Paragraph W wherein the adhesive composition adheres one or more substrates, and wherein at least one of the one or more substrates comprises paper, cardboard, plastic, nonwoven, metal, wood, other natural fiber based material, or combinations thereof.

EXAMPLES

"Peel" or "Peel Strength" is a measure of the average force to pull apart two bonded materials, measured in grams. Peel is tested in a T-Peel fashion on a slip/peel tester from IMASS Inc. at 12 in/min, as determined by ASTM D-903.

"Application Temperature" is the temperature, in ° C., at which an adhesive formulation is applied to bond two substrates together.

"Failure Mode" is used to describe the location of the adhesive once a peel or delamination test is performed. Adhesive failure (AF) is defined as 100% of the adhesive remaining to the original substrate. Adhesive transfer (AT) is defined as 100% of the adhesive transferring to the opposite substrate. Cohesive failure (CF) is defined as an adhesive split where there is adhesive on both substrates.

To apply the adhesive to the substrate, one or more polymer blends, optionally with other additives, including one or more tackifiers, one or more polymer additives, one or more waxes, and one or more antioxidants, is preheated at the application temperature until the polymer is molten. The molten material is poured into a hot melt tank and allowed to equilibrate. The pump speed is set and the add-on is calculated based on the amount of adhesive that passes through the nozzle in a given time.

In a pilot plant, propylene-ethylene copolymers are produced by reacting a feed stream of propylene with a feed stream of ethylene in the presence of a metallocene catalyst. Table 1 shows properties of polymer blends used in the Examples, and these polymer blends are generally produced in accordance with the method disclosed in WO Publication No. 2013/134038. The adhesive blends presented in the Tables below are prepared by preheating the tackifier, oil, antioxidant, and other additives to 177° C. One or more polymer blends is slowly added in a heated mantle at 177° C. to the molten liquid of tackifier, oil, antioxidant, and other additives, until all of the polymer has been added and is completed blended. The components are blended by manual stirring using a spatula until all polymer pellets are melted and the mixture is homogeneous. The components are stirred for an additional 10 minutes. The adhesive blend is removed from the heating mantle, and poured onto release paper. After the adhesive blend solidifies, it is cut into small pieces for testing.

The comparative example (referred to herein as Comparative) is the commercially available premium grade of hot melt adhesives used for nonwoven applications by H. B. Fuller: D3166.

Table 1 lists the polymer blends used in the examples of the invention. The term "Bi-modal" as used in Table 1 is used to refer to polymers or polymer blends which have more than one compositional peak when measured by GPC, DSC, or TREF. The invention is not limited to the polymer blends disclosed in Table 1.

Table 2 shows peel strength and failure mode of 8 adhesive formulations and the Comparative formulation. The initial peel strength of the Comparative formulation is similar to the 1 hour and 24 hour peel strength values. In contrast, peel strength of the inventive adhesive formulations generally increase over time, i.e. building ultimate strength over time, for adhesive formulations having polymer blends with a heat of fusion greater than 23 (such as Example 5A or 7A) or within 24 hours for polymers with a heat of fusion of less than 24 (Examples 4A and 9A). The examples indicate a correlation between heat of fusion of the polymer blend used in the formulation and peel strength. Polymers blends having low heat of fusion, such as Example 6, are softer and lower in cohesion but can be formulated into nonwoven applications. Polymer blends having higher heat of fusion, such as Example 8A, display decreasing peel strength over time as the crystallinity builds faster than adhesion. Polymer blends with very high heat of fusion, such as Example 3A, show little to no adhesion to the surface and the adhesive transferred to the opposite substrate, i.e. the adhesive was coated to the backsheet but when it peeled apart all of the adhesive had transferred to the nonwoven fibers. The adhesive formulations of Table 2 can be used in construction/laminated nonwovens and for elastic nonwovens alike, preferably for nonwoven construction articles, products, and devices. The formulations may also find utility in other aspects of nonwoven construction.

Table 3 shows peel strength of 12 adhesive formulations having one or more polymer blends. Most of the examples do not have any tackifier, wax, or other additives. Examples 1B and 2B are representative of adhesive formulations used by some manufacturers in construction nonwoven applications. Accordingly, for Table 3 Examples 1B and 2B are comparative examples. Examples 3B-11B show adhesive formulations having only one or more polymer blends with unfavorable changing peel strength over time, as compared to Examples 1B and 2B. Furthermore, Examples 3B-11B have the limitation of lacking adequate adhesion, as indicated by the failure mode, because of not having any tackifier. Example 12B, having a tackifier, displayed superior performance properties including good adhesion and broad application temperature ranges, as compared to Examples 3B-11B. The adhesive formulations of Table 3 can be used in construction/laminated nonwovens and for elastic nonwovens alike, preferably for nonwoven construction articles, products, and devices. The formulations may also find utility in other aspects of nonwoven construction.

Table 4 shows peel strength of 9 adhesive formulations. The adhesive formulation of Example 1C has 100 wt % of a polymer blend as compared to the formulations of Examples 5C-7C having 50 wt % polymer blend. The variability of the polymer loading in the adhesive formulation of the examples, while not compromising performance properties including peel strength, indicate that the formulations of the invention can be prepared to impart flexibility based on the end use application. Table 4 also shows the viscosities of the polymer blends used in the adhesive formulations. Generally, polymer blends having viscosity lower than 6,000 cP, (such as Examples 1C, 2C, 3C, 4C, 7C, and 8C) can make up from about 50 to about 100 wt % of the adhesive formulation to maintain good performance properties. Generally, polymer blends having viscosity greater than or equal to about 6.000 cP, (such as Examples 5C and 6C) can make up from about 30 to about 70 wt % of the adhesive formulation to maintain good performance properties. Example 9C, having a viscosity of 8,000 cP and making up 70 wt % of the adhesive formulation displayed unfavorable decreasing of peel strength over time. However, the present invention does not exclude the adhesive formulation of Example 9C as one of ordinary skill in formulating adhesives could reformulate the composition to result in favorable peel strength values. The adhesive formulations of Table 4 can be used in construction/laminated nonwovens and for elastic nonwovens alike, preferably for nonwoven construction articles, products, and devices. The formulations may also find utility in other aspects of nonwoven construction.

Table 5 shows peel strength, viscosities, and failure modes of 17 adhesive formulations. All adhesive formulations include one or more tackifiers and optionally a plasticizer. Adhesive formulations having one or more tackifiers with a Softening Point from about 80° C. to about 145° C. and Aromaticity from about 0 to about 15 mol % aromatic protons, when mixed with one or more polymer blends, displayed superior performance properties indicating the versatile tackifiers that can be added to the adhesive formulations. Table 5 also shows the viscosity of the adhesive formulations at 140° C. The adhesive formulations of Table 5 can be used in construction/laminated nonwovens and for elastic nonwovens alike, preferably for nonwoven construction articles, products, and devices. The formulations may also find utility in other aspects of nonwoven construction.

Figure 3:
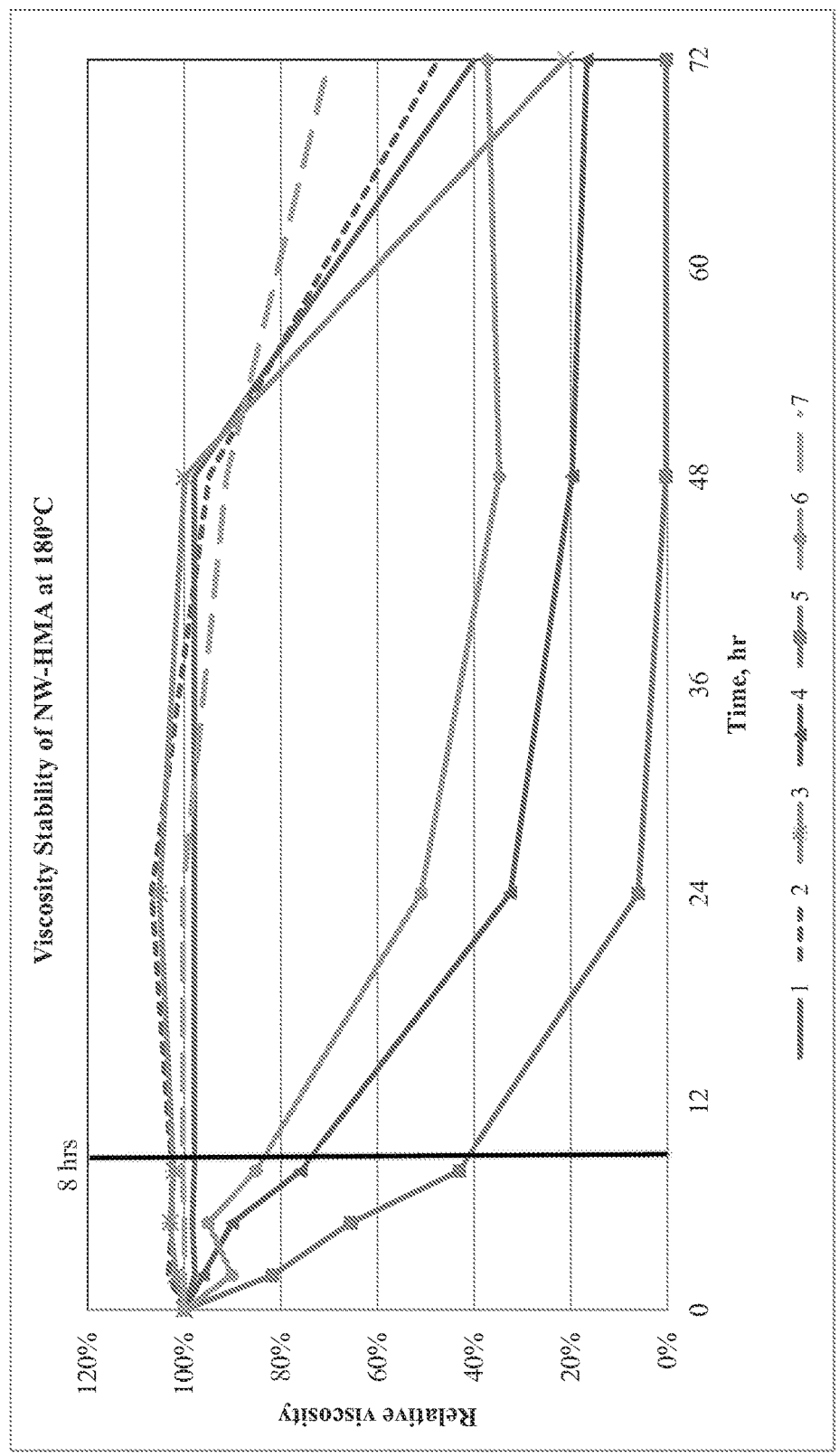
FIG. 3 depicts viscosity stability of hot melt adhesive formulations.

Table 6 shows adhesive formulations evaluated in FIG. 3.

Table 7 shows the peel strength and viscosity of an adhesive formulation having 50 wt % of a polymer blend, a tackifier, and an oil at application temperatures of 120° C., 140° C., 160° C. (Examples 1F, 2F, 3F). Table 7 also shows the peel strength of viscosity of an adhesive formulation having 35 wt % of the same polymer blend, 15 wt % of a polymer additive, a tackifier, and an oil, also at application temperatures of 120° C., 140° C., 160° C. (Examples 4F, 5F, 6F). The performance attributes in Table 7 show that adding 15% of a polymer additive in the adhesive formulation decreases viscosity of the formulation for all application temperatures and increases peel strength for all application temperatures. However, as shown by Examples 4F, 5F, and 6F, the addition of polymer additive increases the variability of peel strength over the application temperature range from 120 to 160° C., as compared to Examples 1F, 2F, and 3F.

Table 8 shows the peel strength, failure mode, and viscosities of an adhesive formulation having 50 wt % of a polymer blend, a tackifier, and an oil (Examples 1G, 2G, and 3G). The performance attributes in Table 8 show that the selection of tackifier can alter the formulation viscosity and peel, including aged peel.

FIG. 1 shows the peel strength of an inventive adhesive formulation having 50 wt % Polymer Blend A and 40 wt % Escorez 5400 compared to the Comparative adhesive at three different application temperatures: 120° C., 140° C., and 160° C. Advantageously, inventive adhesive formulation demonstrate stable peel strength values at lower application temperatures in contrast with the Comparative examples, which unfavorably demonstrate decreasing peel strength at lower application temperatures. The relatively stable peel strength of the inventive adhesive formulation demonstrates that it can be used in a broader application temperature window, for use in a wide range of nonwoven products including construction/laminated nonwovens and elastic nonwovens, as compared to the Comparative which would be limited to higher application temperature uses. While the present invention is not directed to a specific peel strength of the adhesive formulation, but rather is directed to stable peel strengths over different application temperatures, the inventive adhesive formulation surprisingly showed improved peel strength at lower application temperatures, in contrast to the unfavorably decreasing peel strength of the Comparative formulation at lower application temperatures, thereby showing that the inventive formulation may be used to impart strong bonding strength of one or more substrates at low application temperatures.

Figure 2:
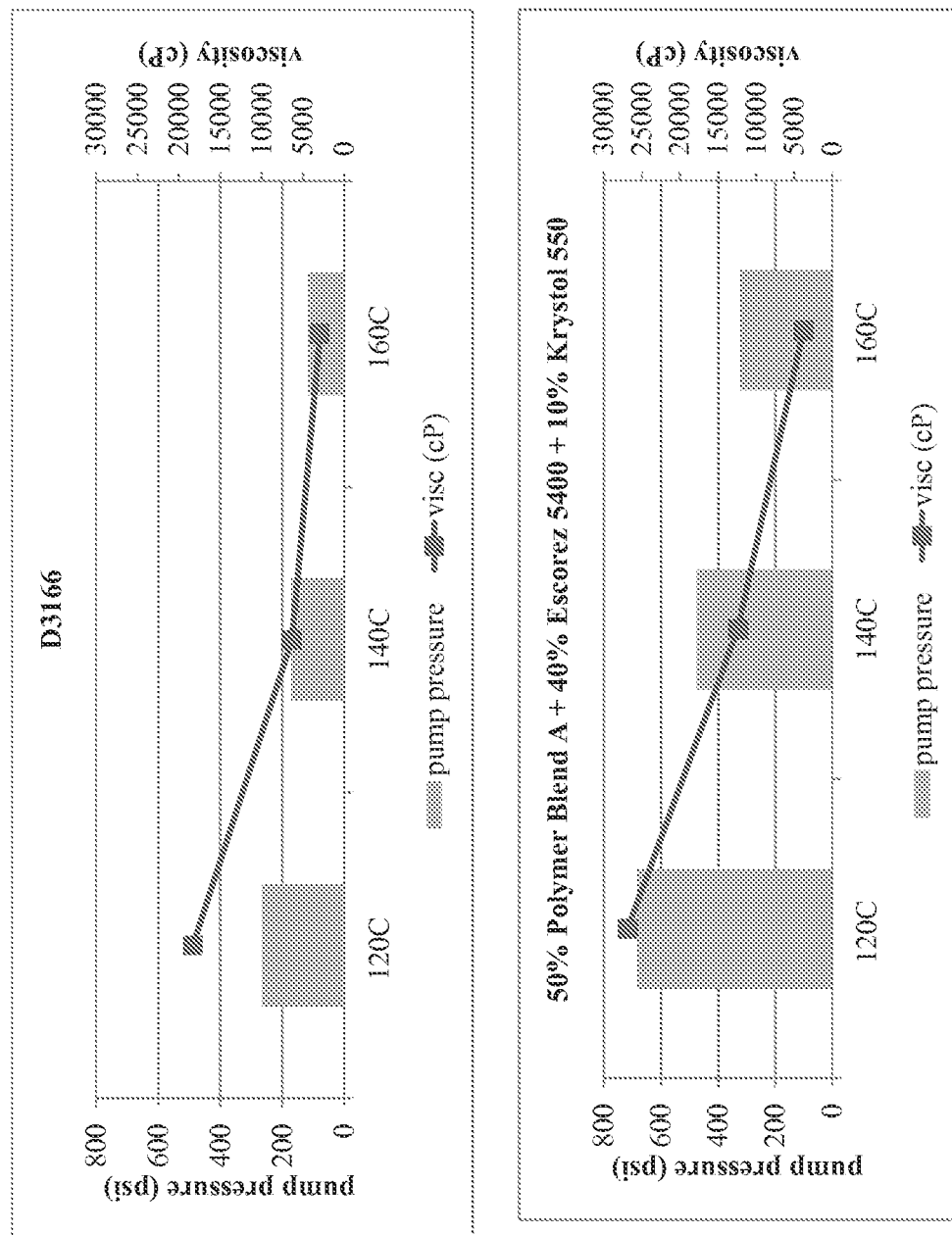
FIG. 2 depicts the pump pressure and viscosities of hot melt adhesive formulations over different application temperatures.

FIG. 2 shows the pump pressure and viscosities of an inventive adhesive formulation having 50 wt % Polymer Blend A and 40 wt % Escorez 5400 compared to the Comparative adhesive over three different application temperatures: 120° C., 140° C., and 160° C. Typically, as the temperature is lowered the viscosity increases and the measured pump pressure also increase. Increasing pump pressure typically results in poor coating of the substrate with the adhesive, for example, when spraying, the adhesive often has an erratic or irregular coating pattern. Surprisingly, the inventive adhesive formulation displayed stable peel strength values at lower application temperatures, as indicated in FIG. 1, despite having a higher pump pressure and viscosity compared to the Comparative. Additionally, the inventive adhesive formulation was sprayable at all application temperature ranges, whereas the Comparative formulation was not sprayable at lower application temperatures. This behavior indicates that inventive adhesive formulation allows for a broader application temperature range.

FIG. 3 shows viscosities of adhesive formulations as determined while the adhesive formulation remained in a hot melt mixing tank at 180° C. Generally, adhesive formulations are applied to one or more substrates, via contact and/or contactless, e.g. spray, application techniques within about 8 hours of preparing the formulation. In the event that an adhesive formulation is left in a hot melt mixing tank at 1800 beyond 8 hours, it is desired that the viscosity of the adhesive formulation remains stable, for up to about 48 hours, i.e. 40 hours beyond the typical time period during which the formulation would generally be used in an application, so that the formulation does not deteriorate in performance attributes, and is still as valuable as if it were applied at 8 hours. Examples 1E, 2E, 3E, and 7E have stable viscosity from 0 to 48 hours. This behavior indicates these adhesive formulations would not change in application quality or induce charring that may result in visibly poor adhesive coating. Examples 4E, 5E, and 6E, having low polymer loading of the adhesive formulation around 20 to 25% (as compared to higher loading of 40-80 wt % in the other Examples) show viscosity degradation as early as 2 hours, even prior to the 8 hour time period that adhesive formulations would generally be kept in a hot melt mixing tank. FIG. 3 indicates that adhesive formulations having higher polymer loading, i.e. above 25 wt %, have favorably stable viscosities when kept in hot melt mixing tanks up to about 48 hours.

TABLE 1

| Polymer Blend | Viscosity at 190° C., cP | DSC Crystallinity, dH, J/g | Shore Hardness C | Ethylene Content, % | DSC Melting Point, ° C. | Bi-modal |
|---|---|---|---|---|---|---|
| A | 12,470 | 19.83 | 31 | 11.14 | 64.65 | yes |
| B | 8,000 | 23.10 | 21 | 12.36 | 100.7 | yes |
| C | 4,087 | 6.23 | 11 | 11.97 | 63.06 | yes |
| D | 3,087 | 26.19 | 22 | 10.46 | 100.95 | yes |
| E | 11,550 | 12.95 | 23 | 12.3 | 64.6 | yes |
| F | 4,268 | 33.95 | 33 | 10.6 | 83.57 | yes |
| G | 37,650 | 17.01 | | 13.5 | 92.1 | yes |
| H | Styrenic block copolymer with diene being isoprene, having a styrene content of 30% and diblock content below 1% available from dexcopolymers. | | | | | |
| I | Styrenic block copolymer with diene being isoprene, having a styrene content of 15% and diblock content of 18% available from dexcopolymers. | | | | | |
| J | Styrenic block copolymer with diene being butadiene, having a styrene content of 29% and diblock content below 1% available from dexcopolymers. | | | | | |
| Rextac ™ 2330 (Source: Rextac LLC located in Texas, USA) | 3,000 | Amorphous PolyAlpha Olefin with medium ethylene content having a Tg of −29° C. and a Ring and Ball Softening Point of 141° C. | | | | |
| Rextac ™ 2730 (Source: Rextac LLC located in Texas, USA) | 3,000 | Amorphous PolyAlpha Olefin with medium ethylene content having a Tg of −23° C. and a Ring and Ball Softening Point of 110° C. | | | | |
| Licocene ™ 2602 (Source: Clariant) | 6,300 (at 170° C.) | mPP wax having medium crystallinity, density of 0.89 g/cm³. | | | | |

TABLE 2

| | Adhesive Formulation (wt % of the Adhesive) | Polymer Blend TM ° C. | Polymer Blend dH J/g | Initial Peel (g)/ Failure Mode | 1 hr Peel (g)/ Failure Mode | 24 hr Peel (g)/ Failure Mode |
|---|---|---|---|---|---|---|
| 1A | Comparative | 81 | 50.85 | 110.83/CF | 110/CF | 114/CF |
| 2A | 80% Rextac ™ 2730/ 20% Eastotac ™ H-130W (coated at 160° C.) | 70 | 10 | 110.5/CF | 112.8/CF | 113/CF |
| 3A | 50% Licocene ™ 2602/ 40% Escorez ™ 5400/ 10% Krystol ™ 550 | 86 | 39 | 75.2/50% AT | 17/100% AT | 6.5/AT |
| 4A | 50% Polymer Blend A/ 40% Escorez ™ 5400/ 10% Krystot ™ 550 | 65 | 19.9 | 64/CF | 58.5/CF | 91.5/CF |
| 5A | 80% Polymer Blend D/ 20% Escorez ™ 5400 | 101 | 29.73 | 112.8/CF | 125/CF | 122.8/CF |
| 6A | 80% Polymer Blend C/ 20% Escorez ™ 5400 | 63 | 6.23 | 100.2/CF | 117/CF | 114.8/CF |
| 7A | 50% Polymer Blend B/ 40% Escorez ™ 5400/ 10% Krystol ™ 550 | 100 | 23.1 | 109/CF | 115/CF | 119/CF |
| 8A | 70% Polymer Blend F/ 20% Escorez ™ 5400/ 10% Krystol ™ 550 | 83 | 33.95 | 81/CF | 54/CF | 26/CF |
| 9A | 50% Polymer Blend E/ 40% Escorez ™ 5400/ 10% Krystol ™ 550 | 65 | 12.95 | 71.7/CF | 71.3/CF | 123.7/CF |

TABLE 3

| | Adhesive Formulation (wt % of the Adhesive) | Polymer Blend(s) Viscosity (cP) at 190 C. | Polymer Blend(s) dH J/g | Initial Peel (g)/ Failure Mode | 1 hr Peel (g)/ Failure Mode | 24 hr Peel (g)/ Failure Mode |
|---|---|---|---|---|---|---|
| 1B | 100% Rextac ™ 2730 150° C. | 3,000 | 10 | 124/CF | 128/CF | 125/CF |
| 2B | 100% Rextac ™ 2730 160° C. | 3,000 | 10 | 114/CF | 121/CF | 125/CF |
| 3B | Polymer Blend C | 4,087 | 6.23 | 85/CF | 53/CF | 32/CF |
| 4B | Polymer Blend D | 2,930 | 29.73 | 38/CF | 18.5/CF | 6/CF |
| 5B | 50% Polymer Blend C/ 50% Polymer Blend D | 2,930/4,087 | 29.73/6.23 | 36/CF | 25/AF | 11/AF |
| 6B | 65% Polymer Blend D/35% Polymer Blend C | 2,930/4,087 | 29.73/6.23 | 32/CF | 20/AF | 12/AF |
| 7B | 75% Polymer Blend D/25% Polymer Blend C | 2,930/4,087 | 29.73/6.23 | 40/AF | 18/AF | 7.5/AF |
| 8B | 90% Polymer Blend D/10% Polymer Blend C | 2,930/4.087 | 29.73/6.23 | 50/CF | 35/AF | 19/AF |
| 9B | 90% Polymer Blend C/10% Polymer Blend D | 2,930/4,087 | 29.73/6.23 | 51/CF | 36/CF | 21/CF |
| 10B | 75% Polymer Blend C/25% Polymer Blend D | 2,930/4,087 | 29.73/6.23 | 59/CF | 45/CF | 17/CF |
| 11B | 50% Polymer Blend C/ 50% Polymer Blend D (slot coat) | 2,930/4,087 | 29.73/6.23 | 79/CF | 57/CF | 51/CF |
| 12B | 40% Polymer Blend C/ 40% Polymer Blend D/ 20% Escorez ™ 5400 | 2,930/4,087 | 29.73/6.23 | 184/CF | 180/CF | 171/CF |

TABLE 4

| | Adhesive Formulation (wt % of the Adhesive) | Polymer Blend(s) Viscosity cP at 190 C. | Polymer Blend(s) dH J/g | Initial Peel (g)/ Failure Mode | 1 hr Peel (g)/ Failure Mode | 24 hr Peel (g)/ Failure Mode | 1 month Peel (g)/ Failure Mode |
|---|---|---|---|---|---|---|---|
| 1C | 100% Polymer Blend C | 4,087 | 6.23 | 144/CF | 121/CF | 95/CF | 75/CF |
| 2C | 80% Polymer Blend D/ 20% Escorez ™ 5400 | 4,087 | 6.23 | 118/CF | 114.7/CF | 106.5/CF | 128/CF |

TABLE 4-continued

|  | Adhesive Formulation (wt % of the Adhesive) | Polymer Blend(s) Viscosity cP at 190 C. | Polymer Blend(s) dH J/g | Initial Peel (g)/ Failure Mode | 1 hr Peel (g)/ Failure Mode | 24 hr Peel (g)/ Failure Mode | 1 month Peel (g)/ Failure Mode |
|---|---|---|---|---|---|---|---|
| 3C | 70% Polymer Blend D/ 30% Escorez™ 5400 | 3,155 | 27.55 | 93/CF | 116/CF | 124/CF | 122/CF |
| 4C | 70% Polymer Blend D/ 20% Escorez™ 5400/ 10% Krystol™ 550 | 3,155 | 27.55 | 59.2/CF | 57.8/CF | 73.2/CF | 76/CF |
| 5C | 50% Polymer Blend B/ 40% Escorez™ 5400/ 10% Krystol™ 550 | 8,000 | 28.44 | 85.7/CF | 102.5 | 101.8/CF | 108/CF |
| 6C | 50% Polymer Blend E/ 40% Escorez™ 5400/ 10% Krystol™ 550 | 11,550 | 12.95 | 75.3/CF | 69.3/CF | 57/CF | 60.2/CF |
| 7C | 50% Polymer Blend C/ 50% Polymer Blend D | 2,930/4,087 | 29.73 | 79/CF | 57/CF | 51/CF |  |
| 8C | 40% Polymer Blend C/ 40% Polymer Blend D/ 20% Escorez™ 5400 | 2,930/4,087 | 29.73 | 184/CF | 180/CF | 171/CF |  |
| 9C | 70% Polymer Blend B/ 20% Escorez™ 5400/ 10% Krystol™ 550 | 8,000 | 28.44 | 87.3/CF | 76.7/CF | 76.5/CF | 70/CF |

TABLE 5

|  | Adhesive Formulation (wt % of the Adhesive) | Initial Peel (g)/ Failure Mode | 1 hr Peel (g)/ Failure Mode | 24 hr Peel (g)/ Failure Mode | 1 month Peel (g)/ Failure Mode | Peel Aged 14 days at 50 C./ Failure Mode | Formulation Viscosity (cP) at 140 C. |
|---|---|---|---|---|---|---|---|
| 1D | 50% Polymer Blend B/ 40% Escorez™ 5400/ 10% Krystol™ 550 | 109/CF | 115/CF | 119/CF | 119/CF | 118.5/CF | 6,950 |
| 2D | 50% Polymer Blend B/ 20% Escorez™ 5400/ 20% Escorez™ 5600/ 10% Krystol™ 550 | 124/AF | 101/CF | 118/CF | 122/CF | 122/CF | 7,000 |
| 3D | 50% Polymer Blend B/ 40% Escorez™ 5340/ 10% Krystol™ 550 | 145/CF | 150/CF | 159/CF | 144/CF | 130/CF | 9,488 |
| 4D | 50% Polymer Blend B/ 40% Escorez™ 5380/ 10% Krystol™ 550 | 94.83/CF | 87/CF | 115/CF | 116/CF | 115/CF | 5,938 |
| 5D | 50% Polymer Blend B/ 40% Escorez™ 5690/ 10% Krystol™ 550 | 87/CF | 88/CF | 97/CF | 85/CF | 56/CF | 6,520 |
| 6D | 80% Polymer Blend D/ 20% Escorez™ 5400 | 141/CF | 135/CF | 158/CF | 123/CF | 125/CF | 10,050 |
| 7D | 80% Polymer Blend D/ 10% Escorez™ 5400/ 10% Escorez™ 5600 | 126/CF | 142/CF | 141/CF | 146/CF | 115/CF | 9,675 |
| 8D | 80% Polymer Blend D/ 20% Escorez™ 5340 | 135/CF | 162/CF | 174/CF | 135/CF | 117/CF | 11,050 |
| 9D | 80% Polymer Blend D/ 20% Escorez™ 5380 | 115/CF | 123/CF | 1112/CF | 108/CF | 101/CF | 9,020 |
| 10D | 80% Polymer Blend D/ 20% Escorez™ 5690 | 126/CF | 121/CF | 121/CF | 80/CF | 56/CF | 9,280 |
| 11D | 50% Polymer Blend B/ 40% Eastotac™ H-130W/ 10% Krystol™ 550 | 91/CF | 71/CF | 23/CF | 20 | 10/CF | 6,713 |

|  | Adhesive Formulation (wt % of the Adhesive) | Initial Peel (g)/ Failure Mode | 1 hr Peel (g)/ Failure Mode | 24 hr Peel (g)/ Failure Mode | 1 month Peel (g) | Peel Aged 14 days at 50 C./ Failure Mode | Viscosity (cP) at 140 C. |
|---|---|---|---|---|---|---|---|
| 12D | 50% Polymer Blend B/ 40% Wingtack™ 95/ 10% Kaystol™ 550 | 94/CF | 98/CF | 92/CF | 88 | 82/CF | 5,430 |

TABLE 5-continued

| | | | | | | | |
|---|---|---|---|---|---|---|---|
| 13D | 50% Polymer Blend B/ 40% Regalrez ™ 1100/ 10% Krystol ™ 550 | 104/CF | 101/CF | 96/CF | 96 | 76/CF | 5,820 |
| 14D | 50% Polymer Blend B/ 40% Arkon ™ M135/ 10% Krystol ™ 550 | | | | | | 10,500 |
| 15D | 50% Polymer Blend B/ 40% Eastotac ™ H142/ 10% Krystol ™ 550 | 91/CF | 72/CF | 37/CF | 23 | 18/CF | 8,725 |
| 16D | 50% Polymer Blend B/ 40% Escorez ™ 5400/ 10% Sucrarez ™ 90 | 87/CF | 93/CF | 98/CF | 114 | 82/CF | 6,250 |
| 17D | 50% Polymer Blend B/ 40% Zonatac ™ 98/ 10% Krystol ™ 550 | 110/CF | 91/CF | 100/CF | 79 | 22/CF | 5,670 |

TABLE 6

| | Adhesive Formulation (wt % of the Adhesive) |
|---|---|
| 1E | 50% Polymer Blend G/ 30% Escorez ™ 5400/ 20% Primol ™ 352/ 1% Irganox ™ 1010 |
| 2E | 40% Polymer Blend G/ 40% Escorez ™ 5400/ 20% Primol ™ 352/ 1% Irganox ™ 1010 |
| 3E | 50% Polymer Blend G/ 40% Escorez ™ 5400/ 10% Primol ™ 352/ 1% Irganox ™ 1010 |
| 4E | 20% Polymer Blend H/ 57% Escorez ™ 5400/ 23% Nyflex ™ 222B/ 1% Irganox ™ 1010 |
| 5E | 25% Polymer Blend I/ 55% Escorez ™ 5600/ 20% Primol ™ 352/ 1% Irganox ™ 1010 |
| 6E | 20% Polymer Blend J/ 60% Escorez ™ 5600/ 20% Primol ™ 352/ 1% Irganox ™ 1010 |
| 7E | 80% Rextac ™ 2330/ 20% Escorez ™ 5415 1% Irganox ™ 1010 |

TABLE 7

| | Adhesive Formulation (wt % of the Adhesive) | Application Temperature (° C.) | Formulation Viscosity (cP) | Peel (g) at 40° C./ Failure Mode |
|---|---|---|---|---|
| 1F | 50% Polymer Blend A/ 40% Escorez ™ 5400/ 10% Krystol ™ 550 | 120 | 26,850 | 70.2/CF |
| 2F | 50% Polymer Blend A/ 40% Escorez ™ 5400/ 10% Krystol ™ 550 | 140 | 12,400 | 66/CF |
| 3F | 50% Polymer Blend A/ 40% Escorez ™ 5400/ 10% Krystol ™ 550 | 160 | 3,800 | 62/CF |
| 4F | 35% Polymer Blend A/ 15% Polymer Additive A/ 40% Escorez ™ 5400/ 10% Krystol ™ 550 | 120 | 13,500 | 80.8/CF |
| 5F | 35% Polymer Blend A/ 15% Polymer Additive A/ 40% Escorez ™ 5400/ 10% Krystol ™ 550 | 140 | 6,350 | 72/CF |
| 6F | 35% Polymer Blend A/ 15% Polymer Additive A/ 40% Escorez ™ 5400/ 10% Krystol ™ 550 | 160 | 2,625 | 65.8/CF |

TABLE 8

| | Adhesive Formulation (wt % of the Adhesive) | Formulation Viscosity at 140° C. (cP) | Peel (g) at Room Temperature Aged <10 min/ Failure Mode | Peel (g) at 140° C./ Aged 1 hr/ Failure Mode | Peel (g) at 140° C./ Aged 24 hrs/ Failure Mode | Peel (g) at 140° C./ Aged 7 days/ Failure Mode |
|---|---|---|---|---|---|---|
| 1G | 50% Polymer Blend B/ 40% Sylvalite ™ RE100L/ 10% Krystol ™ 550/ 0.2% Irganox ™ 1010 | 10,440 | 33/CF | 28/CF | 13/CF | 9/CF |
| 2G | 50% Polymer Blend B/ 40% Kristalex ™ 3100/ 10% Krystol ™ 550/ 0.2% Irganox ™ 1010 | 14,950 | 5/CF | 4/CF | 2/CF | 3/CF |
| 3G | 50% Polymer Blend B/ 40% Foral ™ AX-E/ 10% Krystol ™ 550/ 0.2% Irganox ™ 1010 | 4,290 | 83/CF | 78/CF | 81/CF | 90/CF |
| 4G | 100% D3166 | 6,325 | 88/CF | 101/CF | 105/CF | 129/CF |

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. An adhesive composition comprising:
   (a) a polymer blend comprising
      a first propylene-based polymer, wherein the first propylene-based polymer is a homopolymer of propylene or a copolymer of propylene and ethylene or a $C_4$ to $C_{10}$ alpha-olefin;
      a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer;
      wherein the polymer blend has a melt viscosity, measured at 190° C. of about 100 to about 6,000 cP and wherein, when subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %;
      wherein the polymer blend is present in the amount of about 50 to about 80 wt % of the adhesive composition; and
   (b) a tackifier,
      wherein the adhesive composition has a melt viscosity, measured at 140° C. of about 50 to about 5,500 cP,
      wherein the adhesive composition has a peel strength, as determined by ASTM D-903, that does not vary by more than about 10% over an application temperature of about 110° C. to 190° C.; and
      wherein the adhesive composition is free of plasticizer and wax.

2. The adhesive composition of claim 1, wherein the tackifier has a softening point, as determined by ASTM E-28, of about 80 to about 145° C.

3. The adhesive composition of claim 1, wherein the tackifier has an aromaticity of about 0 to about 15 mol % aromatic protons.

4. The adhesive composition of claim 1, wherein the tackifier may be a single tackifier or a blend of one or more tackifiers.

5. The adhesive composition of claim 1, further comprising an antioxidant.

6. The adhesive composition of claim 1, further comprising one or more polymer additives having a lower total melt viscosity, measured at 190° C., and higher total crystallinity, as compared to the melt viscosity and crystallinity of the polymer blend.

7. The adhesive composition of claim 1, wherein the polymer blend has a heat of fusion of between about 5 to about 30 J/g.

8. The adhesive composition of claim 1, wherein the melt viscosity of the adhesive composition, measured at 180° C., does not vary by more than about 10% for up to about 48 hours.

9. An article comprising the adhesive composition of claim 1.

10. An article of claim 9, wherein the adhesive composition adheres one or more substrates, and wherein at least one of the one or more substrates comprises paper, cardboard, plastic, nonwoven, metal, wood, other natural fiber based material, or combinations thereof.

* * * * *